July 21, 1925.  1,546,429
H. W. BAKER ET AL
ANIMAL TRAP
Filed March 6, 1925
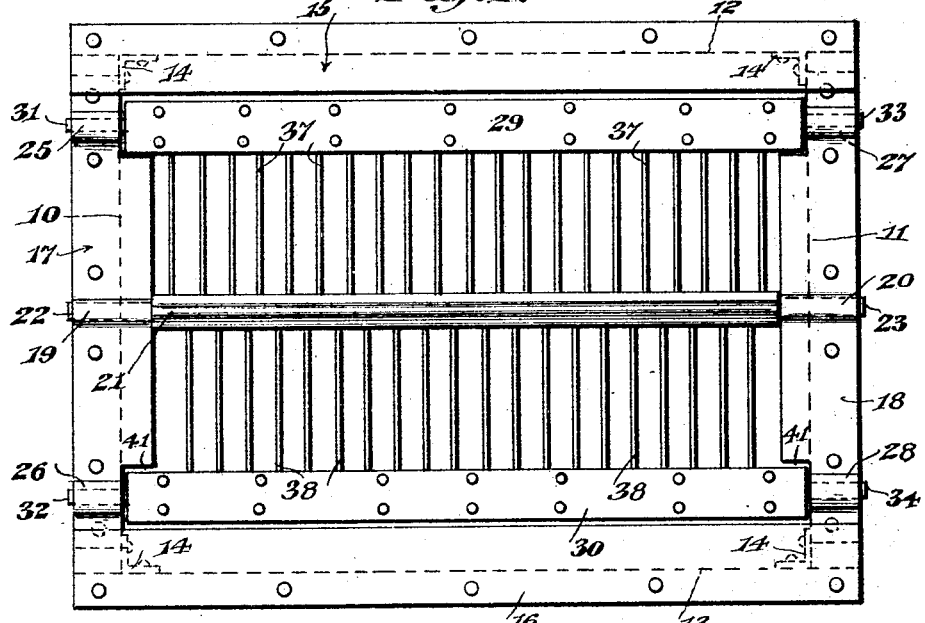
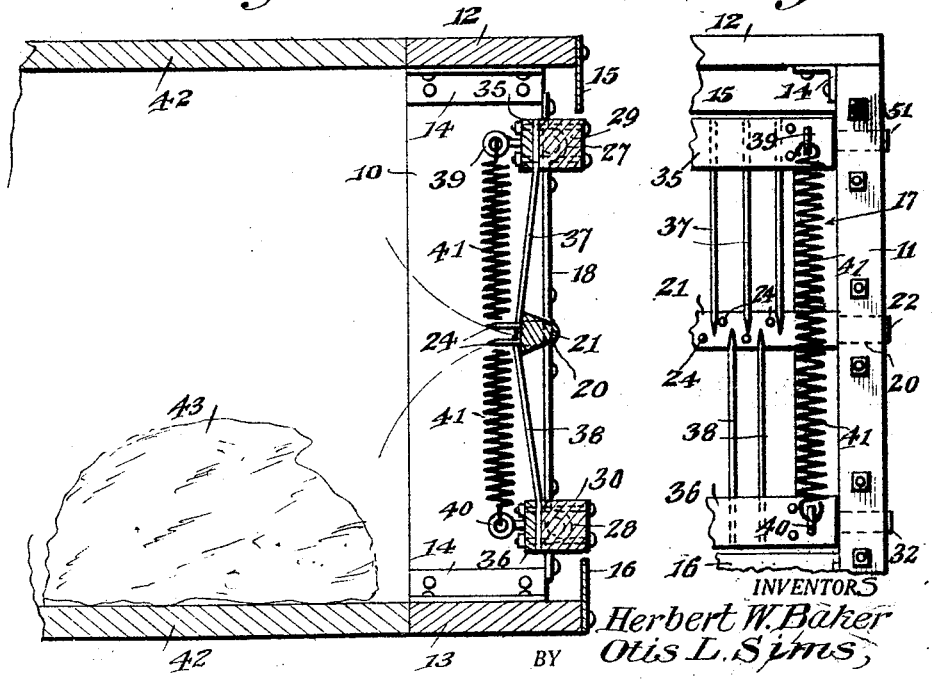
INVENTORS
Herbert W. Baker
Otis L. Sims
BY
Geo. F. Kimmel
ATTORNEY.

Patented July 21, 1925.

1,546,429

UNITED STATES PATENT OFFICE.

HUBERT W. BAKER AND OTIS L. SIMS, OF SAN ANGELO, TEXAS.

ANIMAL TRAP.

Application filed March 6, 1925. Serial No. 13,593.

*To all whom it may concern:*

Be it known that we, HUBERT WELDON BAKER and OTIS LEE SIMS, citizens of the United States, residing at San Angelo, in the county of Tom Green and State of Texas, have invented certain new and useful Improvements in Animal Traps, of which the following is a specification.

This invention relates to animal traps, and has for one of its objects to simplify, and improve the construction and increase the efficiency and utility of devices of this character.

Another object of the invention is to provide a device of this character which may be associated with a bait chamber of any form size or construction.

With these and other objects in view, the invention consists in certain novel features of construction as hereinafter shown and described and then specifically pointed out in the claims, and in the drawings illustrative of the preferred embodiment of the invention.

Figure 1 is a front elevation.

Figure 2 is section on the line 2—2 of Figure 1.

Figure 3 is a rear elevation of a portion of the device at one end.

The improved trap includes an oblong open frame formed of vertical side members 10 and 11, upper member 12 and lower member 13, united at their ends, preferably by sections of L bars 14, to increase the rigidity.

The upper and lower frame members 12 and 13 are wider than the end members 10 and 11 and extend in advance thereof as shown in Figure 2, and attached to the extended portions are metal plates 15 and 16, the plates being wider than the frame members to which they are attached to form guards extending partly over the opening of the frame.

Attached to the forward edges of the side frame members 10 and 11 are other metal plates 17 and 18, these plates being wider than the frame members to which they are attached and extend over a portion of the opening to the frame.

Formed in the forward edges of the side frame members 10 and 11 are recesses or seats, indicated at 19 and 20, and closed by the plates 17 and 18, and extending between the side members 10 and 11 is a stop member 21, reduced at the ends as at 22 and 23 to engage respectively in the seats 19 and 20. By this means the stop member is firmly supported at the ends, and held from rotation by the square form of the reduced terminals 22 and 23 fitting in the square recesses or seats 19 and 20.

Extending inwardly from the stop member 21 in spaced relation are a plurality of pointed spikes 24.

At points near their ends the plates 17 and 18 are bent outwardly to form bearings 25—26—27 and 28, and extending between the frame members 10 and 11 are beam members 29 and 30 with journals 31—32—33 and 34 rotatively engaging in the bearings.

Attached to the inner face of the upper beam 29 is a holding plate 35, and likewise attached to the inner face of the lower beam 30 is a similar holding plate 36.

Disposed between the beam 29 and the holding member 35 are a plurality of rods or bars 37 with pointed lower terminals, and disposed between the beam 30 and the holding member 36 are a plurality of like bars or rods 38 with pointed upper terminals.

The pointed terminals of the bars 37 and 38 overlap the inner face of the stop member 21 and between the spike 24 when in one position, as shown.

The holding member 35 is provided with eye bolts at the ends one of which is shown at 39, while the holding member 36 is provided with like eye bolts at the ends, one of which is shown at 40. Coiled springs one of which is shown at 41, are coupled at their ends to the eye bolts, and thus exert their force to hold the beams in position with the pointed terminals of the bars 37 and 38 yieldably against the stop member 21, as shown.

The springs are covered and protected by the guard plates 17 and 18.

The supporting frame with its attachments will be associated with a suitable bait chamber or closure, a portion of which is represented at 42, and will be supplied with bait elements, as indicated conventionally at 43, and the improved device will be so arranged that the only access to the bait is through the supporting frame.

When thus arranged an animal in his efforts to reach the bait engages the bars 38 with its head and the latter will yield to this pressure, and permit the head of the animal to pass, but will not permit the body to pass, and any attempt of the animal to withdraw his head will cause the points of the bars 37 and spikes 24 to penetrate the neck and effectually trap the animal, and the struggle to free itself will cause the pointed members to quickly destroy the animal.

The parts will preferably be united by bolts, so that broken or impaired parts can be replaced without discarding unimpaired portions.

The frame members stop member and beams will generally be of hard wood, while the remaining portions are of metal, but all the parts may be of metal, if preferred.

The supporting frame may be of any required size to correspond to the size of the animal to be trapped.

Having thus described the invention, what is claimed as new is:—

1. In an animal trap, an open frame adapted to be disposed at the entrance of a bait chamber, a stop member extending transversely of said frame a plurality of spike elements extending from said stop member in spaced relation directed toward the interior of the frame, a beam member mounted for oscillation upon said frame, a plurality of pointed bars attached to said beam in spaced relation and terminating when in one position adjacent said spike elements, and means operating to yieldably support said bars with their terminals against the stop member.

2. In an animal trap, an open frame adapted to be disposed at the entrance of a bait chamber, a stop member extending transversely of said frame intermediate thereof, a plurality of spike elements extending from said stop member in spaced relation and directed toward the interior of the frame, beam members mounted for oscillation upon said frame, above and below said stop member, a plurality of pointed bars attached to each of said beams in spaced relation and terminating when in one position adjacent said spike elements, and means operating to yieldably support said bars with their terminals against the stop member.

3. In an animal trap, an open frame adapted to be located at the entrance to a bait chamber and having seats in its side members intermediate the ends, guard plates attached to the side members of said frame and overhanging the interior thereof and extending over said seats and forming closures to the same and having bearings near the ends, a stop member extending between the side members of said frame and engaging at the ends in said seats and held from rotation thereby, a plurality of spike elements attached to said stop member in spaced relation and directed toward the interior of the frame, beam members having journals at the ends rotatively engaging said bearings, a plurality of pointed bars connected to said beams in spaced relation and terminating when in one position between said spike elements, and means operating to yieldably hold said beams with the pointed terminals of the bars against the inner face of said stop member.

4. In an animal trap, an open frame adapted to be disposed at the entrance of a bait chamber, a stop member extending transversely of said frame, a plurality of spike elements extending from said stop member in spaced relation directed toward the interior of the frame, a beam member mounted for oscillation upon said frame, a holding member attached to said beam, a plurality of pointed bars held at one end in spaced relation between said beam and the holding member and terminating when in one position by their pointed ends between said spike elements, and means connected to said beam for yieldably holding the pointed terminals of the bars against the stop member.

In testimony whereof, we affix our signatures hereto.

HUBERT W. BAKER.
OTIS L. SIMS.